US012304868B2

(12) United States Patent
Lu et al.

(10) Patent No.: US 12,304,868 B2
(45) Date of Patent: May 20, 2025

(54) METHOD FOR PREPARING CERAMIC MATERIALS AND PRODUCTS THEREOF

(71) Applicant: City University of Hong Kong, Hong Kong (CN)

(72) Inventors: Jian Lu, Hong Kong (CN); Yang Yang Li, Hong Kong (CN); Zhengtao Xu, Hong Kong (CN); Hao Wang, Hong Kong (CN)

(73) Assignee: City University of Hong Kong, Hong Kong (CN)

( * ) Notice: Subject to any disclaimer, the term of this patent is extended or adjusted under 35 U.S.C. 154(b) by 925 days.

(21) Appl. No.: 17/447,142

(22) Filed: Sep. 8, 2021

(65) Prior Publication Data

US 2022/0073431 A1 Mar. 10, 2022

Related U.S. Application Data

(60) Provisional application No. 63/075,929, filed on Sep. 9, 2020.

(51) Int. Cl.
*C04B 35/624* (2006.01)
*C04B 35/63* (2006.01)

(52) U.S. Cl.
CPC ........ *C04B 35/624* (2013.01); *C04B 35/6303* (2013.01)

(58) Field of Classification Search
CPC .................................................. C04B 35/624
See application file for complete search history.

(56) References Cited

U.S. PATENT DOCUMENTS

2003/0180213 A1* 9/2003 Carnes ................... B01J 23/002
423/628
2014/0170350 A1* 6/2014 Sakamoto ........... C04B 35/6265
428/221

FOREIGN PATENT DOCUMENTS

| CN | 107176836 A | * | 9/2017 | ............. C04B 35/48 |
| CN | 110963530 A | * | 4/2020 | ............. B82Y 40/00 |
| KR | 2013075115 A | * | 7/2013 | ............. B82Y 40/00 |

OTHER PUBLICATIONS

CN-107176836-A (Chen) Sep. 19, 2017 (English language machine translation). [online] [retrieved Feb. 20, 2025]. Retrieved from: Espacenet. (Year: 2017).*
KR-2013075115-A (Hun) Jul. 5, 2013 (English language machine translation). [online] [retrieved Feb. 20, 2025]. Retrieved from: Espacenet. (Year: 2013).*
CN-110963530-A (Liu) Apr. 7, 2020 (English language translation). [online] [retrieved Feb. 20, 2025]. Retrieved from: Clarivate Analytics. (Year: 2020).*
Bouville, F., et al. Geologically-inspired strong bulk ceramics made with water at room temperature. Nat. Commun. 8, 14655 (2017).

(Continued)

*Primary Examiner* — Erin Snelting
(74) *Attorney, Agent, or Firm* — S&F/WEHRW

(57) ABSTRACT

Provided herein is a method of preparing a ceramic material including the steps of providing a ceramic gel comprising a plurality of metal hydroxides and a solvent; and subjecting the ceramic gel to a drying process thereby removing at least a portion of the solvent and forming the ceramic material; and ceramic gels useful for preparing molded ceramic structures.

16 Claims, 12 Drawing Sheets

(56) References Cited

OTHER PUBLICATIONS

Bouville, F., et al. Strong, tough and stiff bioinspired ceramics from brittle constituents. Nat. Mater. 13, 508-514 (2014).
Guo, J., et al. Cold Sintering: A paradigm shift for processing and integration of ceramics. Angew. Chem. Int. Edit. 55, 11457-11461 (2016).
Guo J., et al. Cold sintering: progress, challenges, and future opportunities. Annu. Rev. Mater. Res. 49, 275-295 (2019).
Ejima H., et al. One-step assembly of coordination complexes for versatile film and particle engineering. Science 341, 154-157 (2013).
Feinle, A., et al. Sol-gel synthesis of monolithic materials with hierarchical porosity. Chem. Soc. Rev. 45, 3377-3399 (2016).
Tian, T., et al. A sol-gel monolithic metal-organic framework with enhanced methane uptake. Nat. Mater. 17, 174-179 (2018).
Mondal, C., et al. Pure inorganic gel: a new host with tremendous sorption capability. Chem. Commun. 49, 9428-9430 (2013).
Yeh, J.-W., et al. Nanostructured high-entropy alloys with multiple principal elements: Novel alloy design concepts and outcomes. Adv. Eng. Mater. 6, 299-303 (2004).
Ding, Q., et al. Tuning element distribution, structure and properties by composition in high-entropy alloys. Nature 574, 223-227 (2019).
Chen, X., et al. Increasing solar absorption for photocatalysis with black hydrogenated titanium dioxide nanocrystals. Science 331, 746-750 (2011).
Ning, C.-Z., et al. Bandgap engineering in semiconductor alloy nanomaterials with widely tunable compositions. Nat. Rev. Mater. 2 (2017).

* cited by examiner

METHOD FOR PREPARING CERAMIC MATERIALS AND PRODUCTS THEREOF

CROSS-REFERENCE TO RELATED APPLICATIONS

This application claims priority from U.S. Provisional Patent Application No. 63/075,929 filed on Sep. 9, 2020, the content of which is hereby incorporated by reference in its entirety.

TECHNICAL FIELD

The present disclosure relates to a mild method for preparing ceramic materials and ceramic gels useful for preparing molded ceramic structures.

BACKGROUND

Ceramic materials are mechanically hard, exceptionally high-melting, and therefore very difficult to cast or mold like metals or polymers. Conventionally, ceramic objects are fabricated by first compacting fine powders into a "greenware" followed by firing at high temperatures, with high pressures sometimes needed. This sintering method is complex, costly, labor-intensive (particularly when tedious post-treatments of polishing and finishing are needed), and is unfriendly for precision manufacturing.

Recently, cold-sintering has been intensively studied as a more convenient method for producing monolithic ceramics at lower temperatures (e.g., 150° C.). This method utilizes high pressures to compress inorganic particles, with an added liquid phase to promote the inter-particle bonding during the densification process. However, high pressures aside, the cold-sintering techniques are restricted to small sample size of regular geometries, and unfavorable for mass production. Hence, the low-temperature and large-scale manufacturing of ceramic devices with flexible geometric designs remains an exceptionally difficult task using conventional methods. To address this challenge, it would be highly desirable to achieve the ability to conveniently cast or mold ceramics like metals or polymers, preferably under mild conditions.

Accordingly, there exists a need to develop improved methods for preparing ceramic materials that overcome at least some the challenges discussed above.

Summary

Provided herein is a general method for directly fabricating ceramic gels and ceramic materials at room temperature and ambient pressure, all by simply mixing precursor solutions of multiple metal salts/ionic compounds to afford a supervariate system. Upon drying, the supervariate ceramic gels convert into monolithic ceramic materials that exhibit good mechanical properties, such as a hardness/Young's Modulus of 1.2/26 GPa. Furthermore, the as-dried ceramics are tolerant to high-temperature annealing, staying intact without melting at 1500° C. With the supervariate systems of present disclosure, ceramics can be easily cast and molded like metals or polymers under very mild conditions, while offering superior mechanical performances and functionalities.

In a first aspect, provided herein is a method of preparing a ceramic material, the method comprising: providing a ceramic gel comprising a plurality of metal hydroxides and a solvent; and subjecting the ceramic gel to a drying process thereby removing at least a portion of the solvent and forming the ceramic material.

In certain embodiments, the ceramic gel comprises three or more metal hydroxides.

In certain embodiments, each of the plurality of metal hydroxides comprise a metal selected from Group 2, 4, 6, 7, 9, 10, 13, or 14 of the periodic table of elements.

In certain embodiments, each of the plurality of metal hydroxides comprise a metal selected from the group consisting of iron, cobalt, nickel, manganese, aluminum, molybdenum, tungsten, zinc, magnesium, calcium, titanium, and tin.

In certain embodiments, the ceramic gel comprises three or more metal hydroxides.

In certain embodiments, the solvent comprises water, an alcohol, dimethylformamide, dimethyl sulfoxide, or a mixture thereof.

In certain embodiments, the method further comprises the step of: providing a precursor solution comprises a plurality of metal salts; and combining the precursor solution and an inorganic base selected from the group consisting of an alkali metal hydroxide and an alkaline earth metal hydroxide thereby forming the ceramic gel.

In certain embodiments, each of the plurality of metal salts comprise one or more anions selected from the group consisting of nitrate, phosphate, sulfate, acetate, oxalate, hydrogenphosphate, carbonate, bicarbonate, and halide.

In certain embodiments, the inorganic base is LiOH, NaOH, or KOH.

In certain embodiments, the concentration of each of the plurality of metal salts in the precursor solution is 0.1-10 mmol/L.

In certain embodiments, the drying process comprises drying at 20-100° C.

In certain embodiments, the method further comprises annealing the ceramic material at 500-2,000° C. thereby forming an annealed ceramic material.

In certain embodiments, the annealed ceramic material is substantially amorphous.

In certain embodiments, the ceramic material has a hardness of 0.8-1 GPa and an elastic modulus of 20-23 GPa.

In certain embodiments, the annealed ceramic material has a hardness of 2.4-11.7 GPa and an elastic modulus of 51-132 GPa.

In certain embodiments, the ceramic gel further comprises a thickening agent; and the method further comprises the steps of casting or molding the ceramic gel thereby forming a molded ceramic gel; subjecting the molded ceramic gel to a drying process thereby forming a molded ceramic gel material; and annealing the molded ceramic gel material.

In certain embodiments, the thickening agent is selected from the group consisting of a polyurethane thickener, a polyacrylate thickener, a hydrophobically-modified polyacrylate thickener, a hydrophobically-modified polyether thickener, a cellulose ether thickener, a hydrophobically-modified cellulose ether thickener.

In certain embodiments, the method comprises: providing a ceramic gel comprising at least four metal hydroxides comprising a metal selected from the group consisting of iron, cobalt, nickel, manganese, aluminum, molybdenum, tungsten, zinc, magnesium, calcium, titanium, and tin; and a solvent selected from the group consisting of water, methanol, ethanol, and mixtures thereof; and subjecting the ceramic gel to drying at a temperature of 20-40° C. thereby removing at least a portion of the solvent and forming the ceramic material; and optionally annealing the ceramic material at a temperature of 1,300-1,700° C.

In certain embodiments, the ceramic gel comprises nickel, iron, manganese, and aluminum or nickel, iron, cobalt, and manganese.

In a second aspect provided herein is a ceramic gel comprising a plurality of metal hydroxides, a solvent, and a thickening agent.

The ceramic gel can first be synthesized under ambient conditions in a mixed solution comprising a variety of metal salts. The gels can then be directly converted into ceramic materials upon drying, e.g., under ambient conditions. Without wishing to be bound by theory, it is believed that the key to the success manufacturing ceramic materials using the gelatinous ceramic gels described herein, rather than fragmented precipitation particles, lies in a generic mechanism that effectively suppresses new surfaces during the synthetic process. Such a mechanism is enabled by dissolving in the precursor solutions a diverse array of ionic species (e.g., at least three different metal cations) to be gelled and solidified together. In the solidification process, the different ions together offer greatly variable (supervariate) arrays of bonding and aggregating propensities, to allow for filling in the various voids and cracks (e.g., to eliminate the dangling bonds thereof). By comparison, in a single-component system, a rigid, regular lattice is generally imposed, and individual defects easily propagate to cause cracks and new surfaces, and to result in discrete precipitates of small particles, instead of the monolithic solid form as forged from the multi-ion, supervariate system. The term "supervariate" as used herein not only refers to the multi-ion components for the aggregating process, but also the broadly tunable phase behaviors, crystallinity, and properties achieved in these malleable ceramic materials.

The methods described herein provides a remarkably simple and efficient method for accessing monolithic ceramic structures under mild conditions and from common metal salts. Specifically, gelatinous ceramic gels are first synthesized under ambient conditions in a mixed solution using a variety of common salts. The gels then directly turn into monolithic ceramic objects upon drying under ambient conditions. The method described herein exhibits a number of advantages, such as 1) low-cost and facile synthesis: mild temperature, no additional press, easy operation, green synthesis, and easy on post-treatment; 2) simple experimental setup (for example, a domestic oven would be sufficient), without expensive equipment such as vacuum, protective gases, press, or sophisticated control systems which are generally required by other technologies; 3) applicable to a wide range of ceramic systems; 4) easy casting and molding: no limitation on sample size and geometry, facile ceramic precision manufacturing; 5) versatile in continuously tuning the ceramic electronic, optical, catalytic, thermal, mechanical properties; 6) extremely wide applications: thermal barrier ceramics, 3D ceramic printing, ceramic glues, spray-on glazing; and 7) convenient large-area fabrication, highly compatible with mass production on an industrial scale.

BRIEF DESCRIPTION OF TH DRAWINGS

The above and other objects and features of the present disclosure will become apparent from the following description of the disclosure, when taken in conjunction with the accompanying drawings.

FIG. 1 depicts (a) schematic diagram of the synthetic process of supervariate ceramics. (b) Drying and sintering process of 3D printed lattice with the corresponding optical microscope images shown below the sample photographs. (c) Different structures printed from the supervariate ceramic gels.

FIG. 2 depicts. XRD patterns (the JCPDS No.:01-1047) (a) and SEM image (c) of the ceramic samples fabricated with incremented types of metal species. The XRD patterns of $NiFeCoMn(OH)_x$ annealed at 600, 700, 1000 and 1500° C. are shown in (b) (the reference JCPDS NO.: 84-0482). All the samples were fabricated from ethanol solutions, except the one labelled as "$NiFeCoMn(OH)_x$-aq" was synthesized from aqueous solutions.

FIG. 3 depicts TEM images and SAED patterns of $NiFeCoMn(OH)_x$ as-dried at room temperature (a,d), annealed at 700° C. (b,e), and annealed at 1500° C. (c,f). The EDS elemental mapping images (scale bars: 250 nm) and spectrum of $NiFeCoMn(OH)_x$ as-dried at room temperature (g,h).

FIG. 4 depicts typical load-displacement curves (a) and the measured hardness (left bar) and reduced elastic modulus (right bar) values (b) from nanoindentation tests (load applied: 4000 μN) on $NiFeCoMn(OH)_x$ dried at room temperature, and annealed at 700, 1000, and 1500° C. (c) The compressive engineering stress strain curve (load applied: 500 mN) of room-temperature-dried $NiFeCoMn(OH)_x$, with the inset showing the SEM image of the micro-pillar after compression. (d) SEM image of the indents on the room-temperature-dried $NiFeCoMn(OH)_x$.

DETAILED DESCRIPTION

Figure 1:
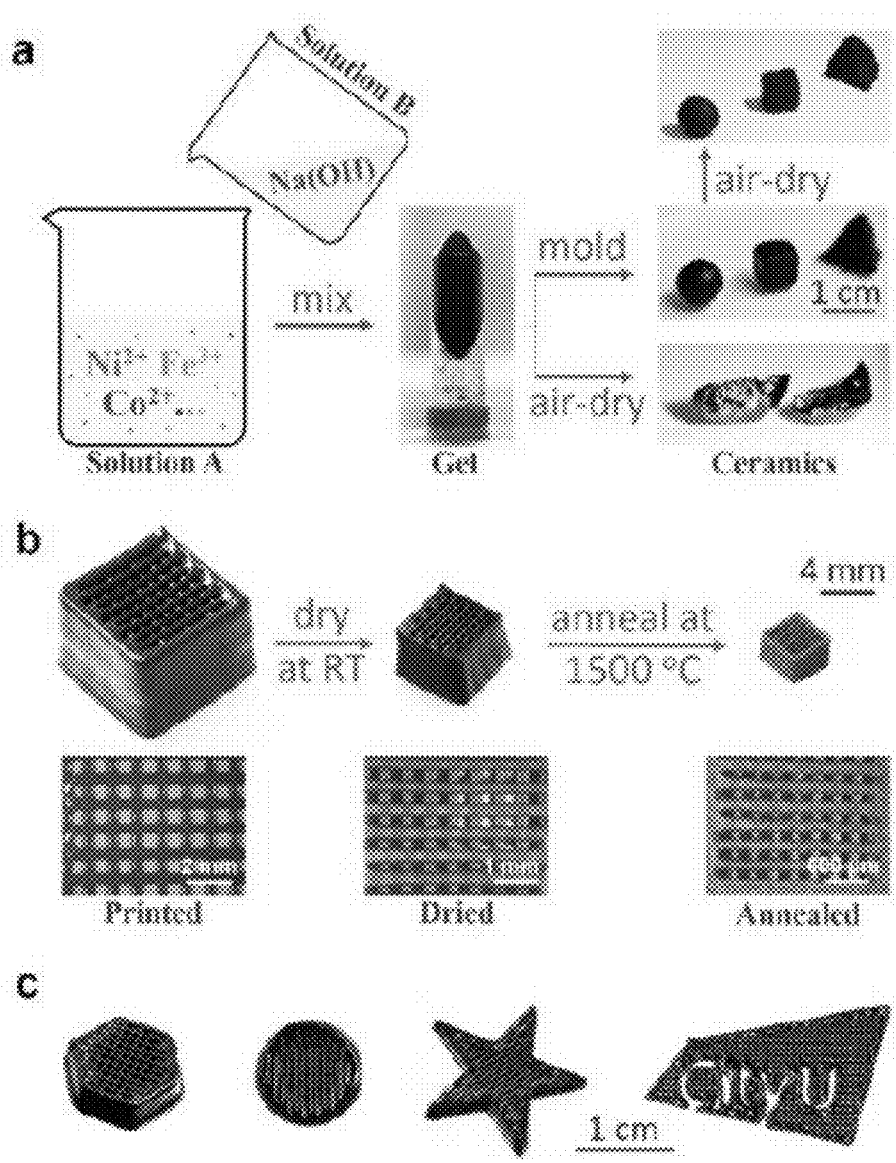

Throughout the present disclosure, unless the context requires otherwise, the word "comprise" or variations such as "comprises" or "comprising", will be understood to imply the inclusion of a stated integer or group of integers but not the exclusion of any other integer or group of integers. It is also noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the present invention.

Furthermore, throughout the present disclosure and claims, unless the context requires otherwise, the word "include" or variations such as "includes" or "including", will be understood to imply the inclusion of a stated integer or group of integers, but not the exclusion of any other integer or group of integers.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10%, ±7%, ±5%, ±3%, ±1%, or ±0% variation from the nominal value unless otherwise indicated or inferred.

The present disclosure provides a method of preparing a ceramic material, the method comprising: providing a ceramic gel comprising a plurality of metal hydroxides and a solvent; and subjecting the ceramic gel to a drying process thereby removing at least a portion of the solvent and forming the ceramic material.

The plurality of metal hydroxides can consist of 2, 3, 4, 5, 6, 7, 8, 9, 10, or more different types of metal hydroxides. In certain embodiments, the plurality of metal hydroxides consists of 2 or more, 3 or more, 4 or more, 5 or more, 6 or more, 7 or more, 8 or more, 9 or more, or 10 or more different types of metal hydroxides. Exemplary ceramic gels can comprise a plurality of metal hydroxides consisting of between 2-10, 3-10, 4-10, 3-9, 4-9, 3-8, 4-8, 3-7, 4-7, 3-6, 4-6, or 3-5 different types of metal hydroxides. By way of example, ceramic gels comprising $NiFeCoMn(OH)_x$, $NiFeCoMnAl(OH)_x$, and $FeCoNiMn(OH)_x$ described herein consist of 4, 5, and 4 different metal hydroxides, respectively.

The plurality of metal hydroxides can comprise two or more metals selected from any metal or metalloid selected from the group consisting of alkali metals, alkaline earth metals, and transition metals; and metalloids selected from the group consisting of carbon group and the boron group. In certain embodiments, the plurality of metal hydroxides comprise two or more metals selected from the group consisting of Group 1, 2, 4, 5, 6, 7, 9, 10, 13, and 14 of the periodic table of elements. Exemplary metals include, but are not limited to, iron, cobalt, nickel, manganese, aluminum, molybdenum, vanadium, tungsten, zinc, magnesium, calcium, titanium, and tin. Exemplary ceramic gels can comprise a plurality of metal hydroxides selected from the group consisting of nickel hydroxide, iron hydroxide, cobalt hydroxide, and manganese hydroxide; nickel hydroxide, iron hydroxide, cobalt hydroxide, manganese hydroxide, aluminum hydroxide; and iron hydroxide, cobalt hydroxide, nickel hydroxide, and manganese hydroxide.

The plurality of metal hydroxides can comprise two or more different types of metals in any oxidation state. The plurality of metal hydroxides can comprise two or more metals, wherein each metal independently has a +1, +2, +3, +4, +5, +6, or +7 oxidation state. In certain embodiments, the plurality of metal hydroxides can comprise two or more different types of metals, wherein each metal independently has a +1, +2, or +3 oxidation state.

Depending on the method of preparation and purification employed to prepare the ceramic gel, the ceramic gel can optionally comprise alkali metal and/or alkaline earth metal salts of nitrate, phosphate, phosphite, acetate, oxalate, hydrogenphosphate, carbonate, bicarbonate, chlorate, sulfide, sulfate, thiosulfate, sulfite, thiocyanate, tetrafluoroborate, hexafluorophosphate, silicate, borate, chlorate, perchlorate, cyanide, halide, or a mixture thereof. In certain embodiments, the ceramic gel further comprises a sodium or potassium salt of chloride, bromide, iodide, nitrate, or a mixture thereof.

The solvent can be any solvent in which the ceramic gel precursors are at least partially soluble in. In certain embodiments, the solvent comprises water, an alcohol, such as methanol, ethanol, isopropanol, ethylene glycol, and glycerol, acetonitrile, nitromethane, dimethylformamide, dimethyl sulfoxide, hexamethylformamide, dioxane, pyridine, acetone, or a mixture thereof. In certain embodiments, the solvent comprises water, methanol, ethanol, or a mixture thereof. In certain embodiments, the solvent comprises ethanol.

The ceramic gel is readily prepared by reacting a precursor solution comprising a plurality of metal salts and an inorganic base selected from the group consisting of an alkali metal hydroxide, an alkaline earth metal hydroxide, sulfide, boride, silicate, fluoride, chloride, bromide, iodide, carbonate, phosphite, and phosphate. The inorganic base can be combined directly (i.e., neat) with the precursor solution or a solution comprising the inorganic base can be combined with the precursor solution. Upon combining the plurality of metal salts and the inorganic base at least a portion of the plurality of metal salts can undergo an anion exchange reaction in which at least a portion of the anions present in each of the plurality of metal salts is exchanged with the hydroxide present in the inorganic base. The resulting plurality of metal hydroxide products can precipitate from solution in the form of a ceramic gel.

In certain instances, the reaction of the metal salt starting material and inorganic base may be incomplete and/or the metal salt starting material, reaction intermediate(s) (e.g., partial ligand exchange intermediates), and the metal hydroxide product of the anion exchange reactions may exist in equilibrium with one or more of each other. In such cases, the ceramic gel can comprise unreacted metal salts and/or reaction intermediates.

The plurality of metal salts can consist of 2, 3, 4, 5, 6, 7, 8, 9, 10, or more different types of metal salts. In certain embodiments, the plurality of metal salts consists of 2 or more, 3 or more, 4 or more, 5 or more, 6 or more, 7 or more, 8 or more, 9 or more, or 10 or more different types of metal salts. In certain embodiments, the plurality of metal salts consists of between 2-10, 3-10, 4-10, 3-9, 4-9, 3-8, 4-8, 3-7, 4-7, 3-6, 4-6, or 3-5 different types of metal salts.

The plurality of metal salts can comprise two or more metals selected from any metal or metalloid selected from alkali metals, alkaline earth metals, and transition metals and metalloids selected from the carbon group and the boron group. In certain embodiments, the plurality of metal salts comprise two or more metals selected from the group consisting of Group 2, 4, 6, 7, 9, 10, 13, and 14 of the periodic table of elements. Exemplary metals include, but are not limited to, iron, cobalt, nickel, manganese, aluminum, molybdenum, tungsten, zinc, magnesium, calcium, titanium, and tin.

The selection of anion present in the plurality of metal salts is not particularly limited. However, the anion present in the plurality of metal salts should be selected such that the resulting plurality of metal salts is at least partially soluble in the precursor solution. Each of the plurality of metal salts can comprise one or more anions selected from the group consisting of nitrate, phosphate, phosphite, acetate, oxalate, hydrogenphosphate, carbonate, bicarbonate, chlorate, sulfide, sulfate, thiosulfate, sulfite, thiocyanate, tetrafluoroborate, hexafluorophosphate, silicate, borate, chlorate, perchlorate, cyanide, and halide (e.g., chloride, bromide, or iodide). In certain embodiments, each of the plurality of metal salts comprises halide anions.

The precursor solution can comprise any precursor solvent in which each of the plurality of metal salts is at least partially soluble in. In certain embodiments, the precursor solvent comprises water, an alcohol selected from methanol, ethanol, isopropanol, ethylene glycol, glycerol, acetonitrile, nitromethane, dimethylformamide, dimethyl sulfoxide, hexamethylformamide, dioxane, pyridine, acetone, or a mixture thereof. In certain embodiments, the precursor solvent comprises water, methanol, ethanol, or a mixture thereof. In certain embodiments, the solvent comprises ethanol.

Each of the plurality of metal salts can independently be present in the precursor solution at a concentration between 0.01-1,000 mmol/L. In certain embodiments, each of the plurality of metal salts is present in the precursor solution at a concentration between 0.01-100 mmol/L, 0.1-100 mmol/L 0.1-75 mmol/L, 0.1-50 mmol/L, 0.1-25 mmol/L, 0.1-15 mmol/L, 0.1-10 mmol/L, 1-10 mmol/L, 2-10 mmol/L, 3-10 mmol/L, 4-10 mmol/L, 5-10 mmol/L, 6-10 mmol/L, 7-10 mmol/L, 7-9 mmol/L, or about 8 mmol/L.

In instances in which a solution of the inorganic base is combined with the precursor solution, the inorganic base solvent can comprise any solvent in which the inorganic base is at least partially soluble in. In certain embodiments, the inorganic base solvent comprises water, an alcohol selected from methanol, ethanol, isopropanol, ethylene glycol, glycerol, acetonitrile, nitromethane, dimethylformamide, dimethyl sulfoxide, hexamethylformamide, dioxane, pyridine, acetone, or a mixture thereof. In certain embodiments, the precursor solvent comprises water, methanol, ethanol, or a mixture thereof. In certain embodiments, the solvent comprises ethanol.

The inorganic base be present in the inorganic base solvent at a concentration between 0.00001-10 M. In certain embodiments, each of the plurality of metal salts is present in the precursor solution at a concentration between 0.01-10 M, 0.01-5 M, 0.01-3 M, 0.01-2 M, 0.01-1 M, 0.1-1 M, 0.1-0.9 M, 0.1-0.8 M, 0.1-0.7 M, 0.1-0.6 M, 0.2-0.6 M, 0.3-0.6 M, 0.3-0.5 M, or about 0.4 M.

A sufficient amount of the inorganic base can be added to the plurality of metal salts to ensure substantially complete reaction of the plurality of metal salts and the inorganic base. The inorganic base can also be present in excess relative to the amount of the plurality of metal salts. The molar ratio of the inorganic base to the total molar amount of the plurality of metal salts can be up to 100:1 or more. In certain embodiments, molar ratio of the inorganic base to the total molar amount of the plurality of metal salts can be up to 100:1; up to 75:1; up to 50:1; up to 25:1; up to 10:1; up to 9:1; up to 8:1; or up to 7:1.

Upon combining the precursor solution and inorganic base a ceramic gel is formed, which can then be optionally separated from the solvent (e.g., by filtration or decanting) subjected to a drying process that removes at least some of any residual solvent and thereby forming the ceramic material.

The temperature that the drying process is conducted at can be contingent on the volatility of the solvent. In certain embodiments, the drying process comprises drying at 20-100° C., 20-90° C., 20-80° C., 20-70° C., 20-60° C., 20-50° C., 20-40° C., 20-30° C., 20-25° C., or at room temperature. In certain embodiments, the drying process is conducted under reduced pressure. The drying process may optionally be conducted under an atmosphere of nitrogen, argon, hydrogen, or carbon dioxide.

The method may further comprise the step of annealing the ceramic material thereby forming an annealed ceramic material. Alternatively, the drying process can be omitted from the method and the ceramic gel can be subjected be directly subjected to annealing. The step of annealing the ceramic material or the ceramic gel can be conducted at a temperature between 200-3,000° C., 500-3,000° C., 500-2,500° C., 500-2,000° C., 500-1,500° C., 500-1,000° C., 1,000-1,500° C., 1,250-1,700° C., or about 1,500° C. The ceramic gel or ceramic material can annealed for 0.5-5 hours.

Advantageously, annealing the ceramic material can produce substantially amorphous annealed ceramic materials, which can have improved physical properties. When the annealed ceramic materials described herein are substantially amorphous, at least 90%, at least 92%, at least 95%, at least 98%, at least 99%, or at least 99.9% or more of the ceramic material can be present in amorphous form.

Advantageously, the ceramic gel can be molded in to a variety of different shapes using any number of molding methods, such as 3D printing. In such embodiments, the ceramic gel comprises a thickening agent. Any thickening agent known in the art can be used in connection with the methods described herein. In certain embodiments, the thickening agent is selected from the group consisting of a polyurethane thickener, a polyacrylate thickener, a hydrophobically-modified polyacrylate thickener, a hydrophobically-modified polyether thickener, a cellulose ether thickener, a hydrophobically-modified cellulose ether thickener. In certain embodiments, the thickening agent is a polyurethane thickener having an average molecular weight of 15,000-1000,00 g/mol sold under the polyurethane-based associative thickener agent sold under the tradename TEGO® Viscoplus (Shunde Sansheng Trade Co. LTD).

In embodiments, the ceramic gel is molded, the method can further comprises the step of molding the ceramic gel comprising the thickening agent thereby forming a molded ceramic gel; subjecting the molded ceramic gel to a drying process thereby forming a molded ceramic gel material; and annealing the molded ceramic gel material.

The present disclosure also provides a ceramic gel comprising a plurality of metal hydroxides, a solvent, and a thickening agent, wherein the plurality of metal hydroxides, the solvent, and the thickening agent are each independently as described in any embodiment or combinations of embodiments disclosed herein.

In the examples below, a common type of ceramic material, metal oxides, was chosen as the exemplary ceramic material system. However, the present disclosure contemplates all types of ceramic materials.

Figure 2:
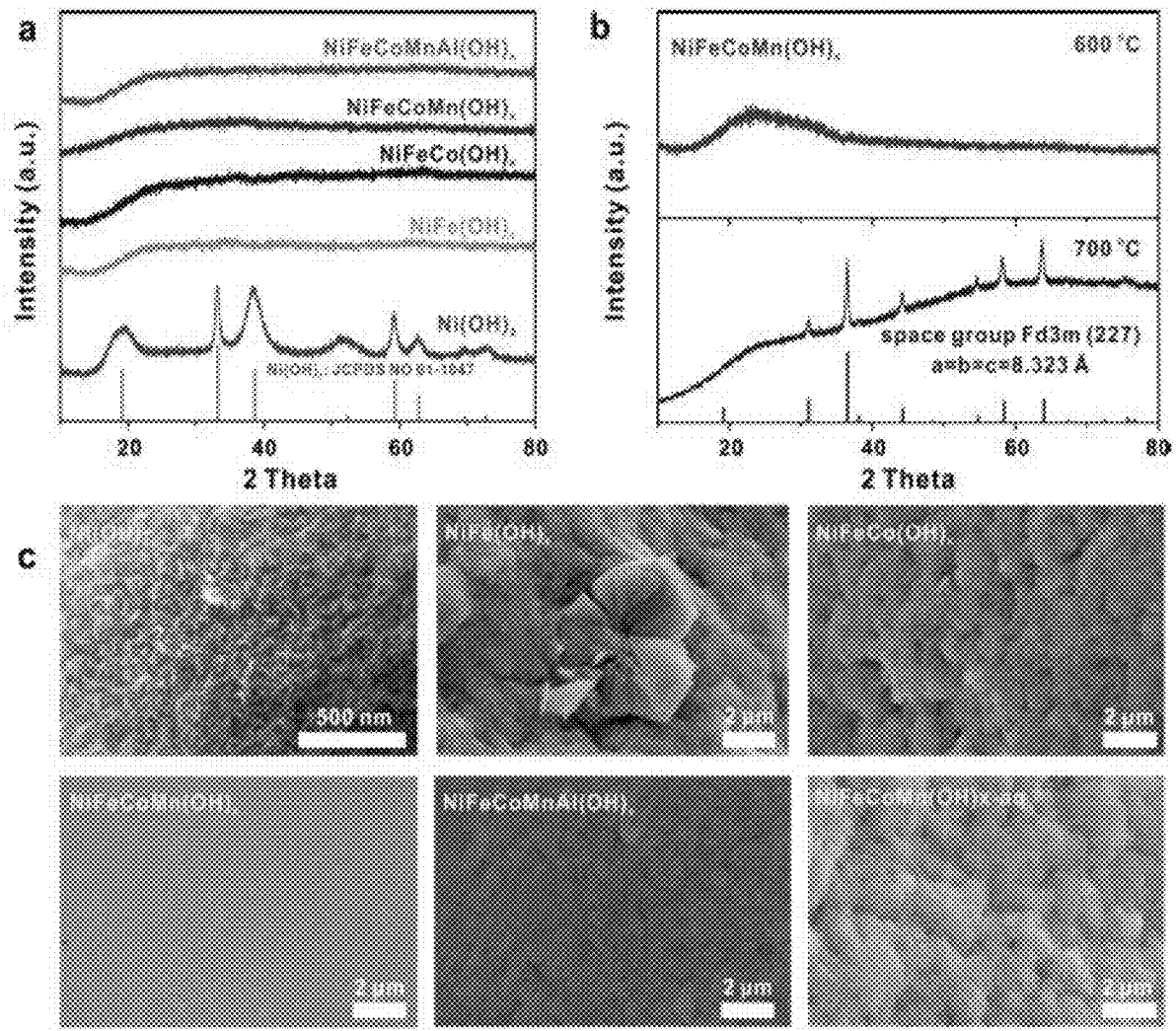
Figure 3:
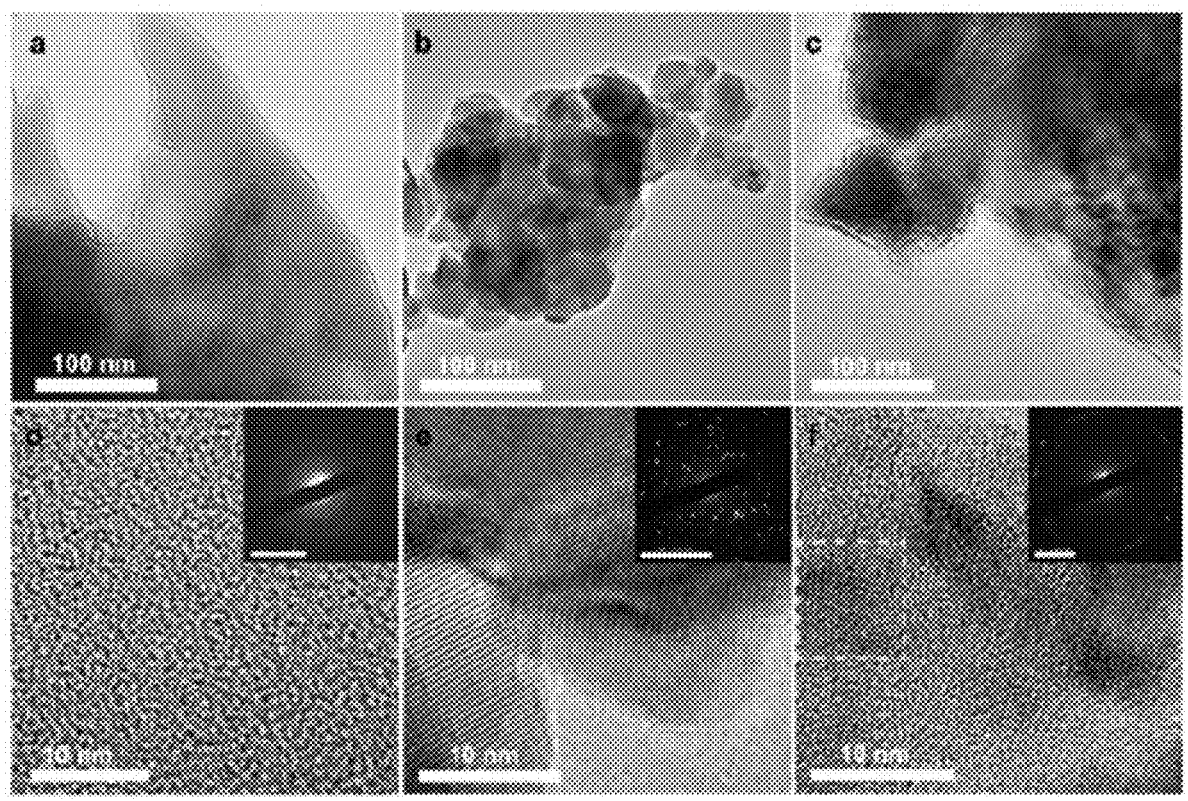
Figure 3:
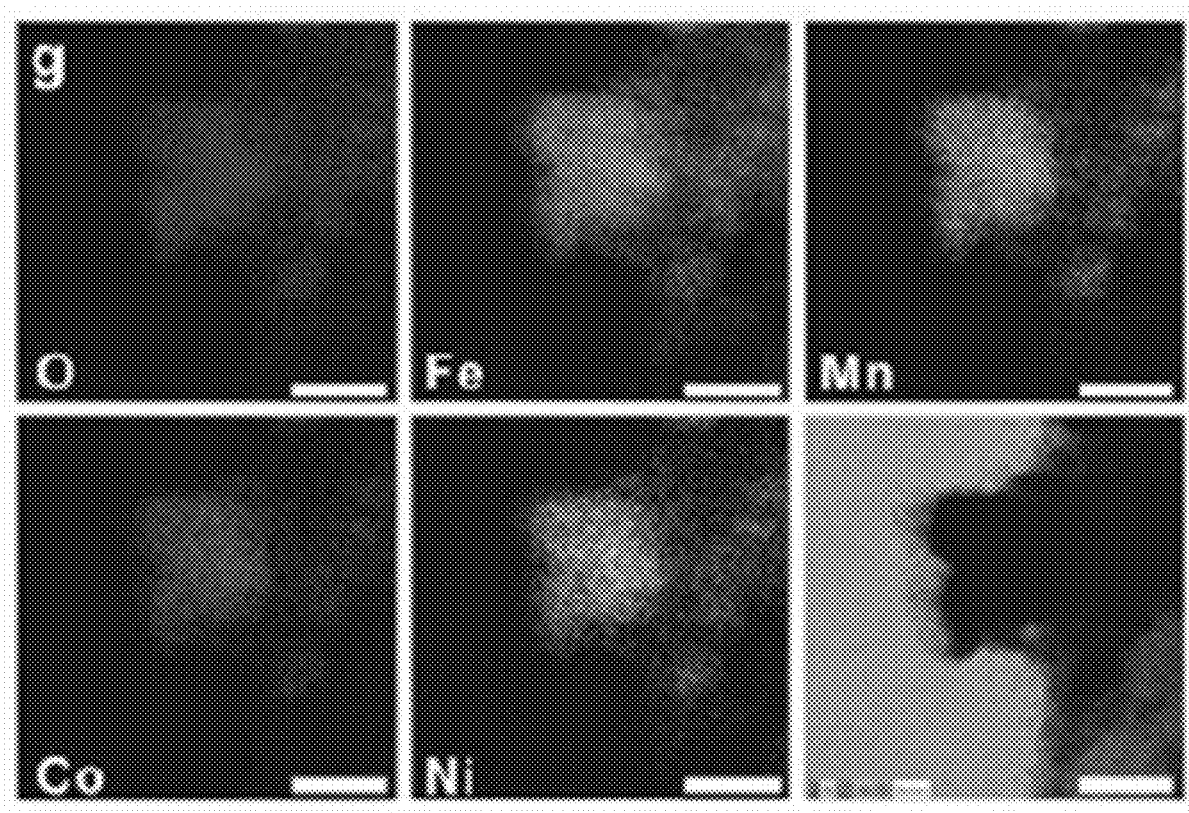
Figure 3:
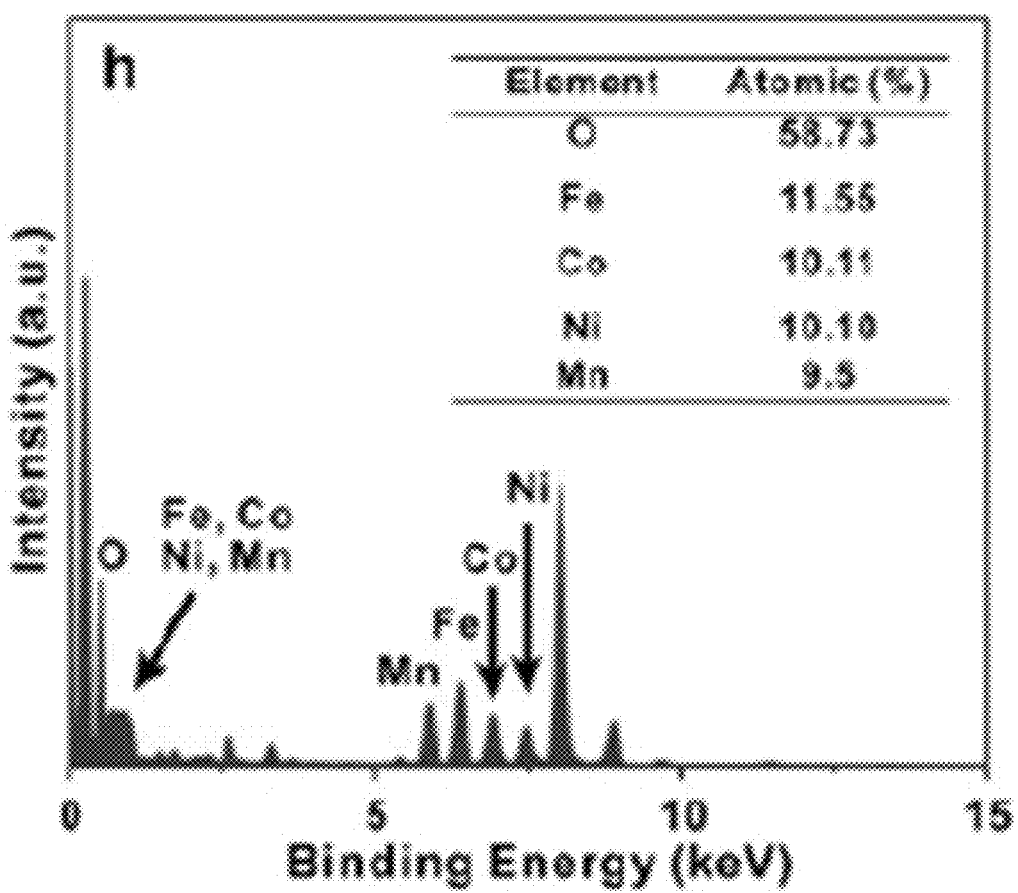
Figure 6:
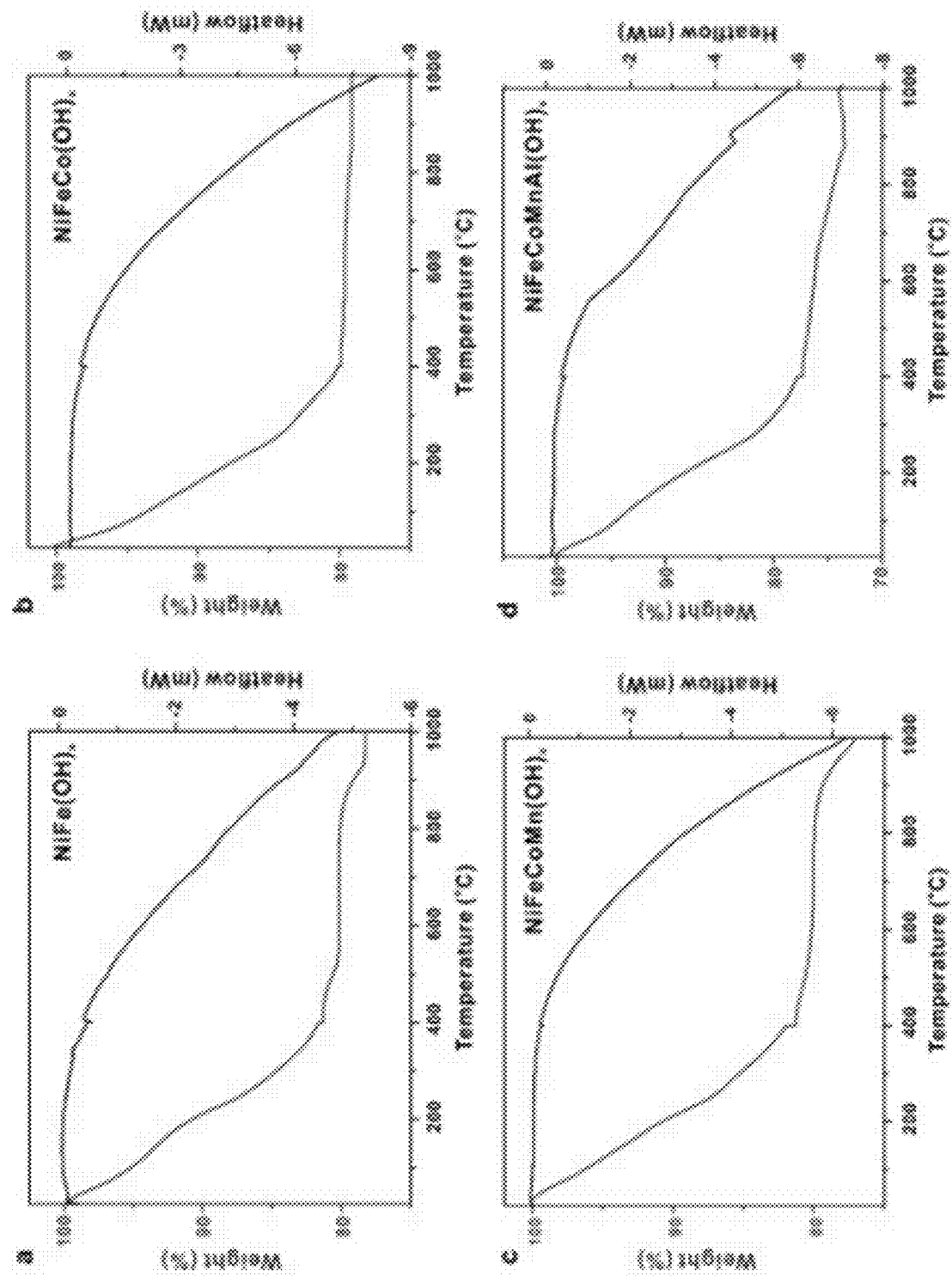
FIG. 6 depicts (a-d) simultaneous thermogravimetry (TG) and differential scanning calorimetry (DSC) measurements of the samples dried at room temperature.

Purely inorganic gels were quickly manufactured by simply mixing solutions of alkaline and multiple types of inorganic salts (e.g., $NiCl_2$, $FeCl_3$, $CoCl_2$, $MnCl_2$, and NaOH), rendering monolithic ceramic materials upon drying in the air at mild temperature (e.g., room temperature). The fabricated ceramic solids were amorphous with even elemental distributions indicating its high-entropy disorderliness, and exhibited compact morphology with smooth and ultrafine surface features at the nanoscale (FIG. 2). Thermal analysis revealed a gradual weight loss of approximately 20 wt % after heated to 1000° C., which is ascribed to the sequential removal of the trapped water and conversion of the hydroxides to oxides (FIG. 6). The fabricated supervariate ceramics displayed a high thermal stability, e.g., the NiFeCoMn-based ceramic remained amorphous till 700° C. when weak X-ray diffraction (XRD) peaks corresponding to a spinel structure were spotted on a broad and high background, indicating that crystallization was initiated in the amorphous matrix around 700° C. (FIG. 2). This spinel phase appeared to possess enlarged lattice parameters after annealing at 1000° C. (FIG. 2b), possibly due to the variance of the metal ions present in the spinel lattice, revealing the rich structural and property adjustability obtained in the amorphous multi-ionic ceramics reported in this study. Interestingly, the NiFeCoMn-based ceramic became amorphous when further heated to 1500° C. (FIG. 2b). TEM study revealed that structural evolution during the annealing process from room temperature to 1500° C. (FIG. 3).

Figure 4:
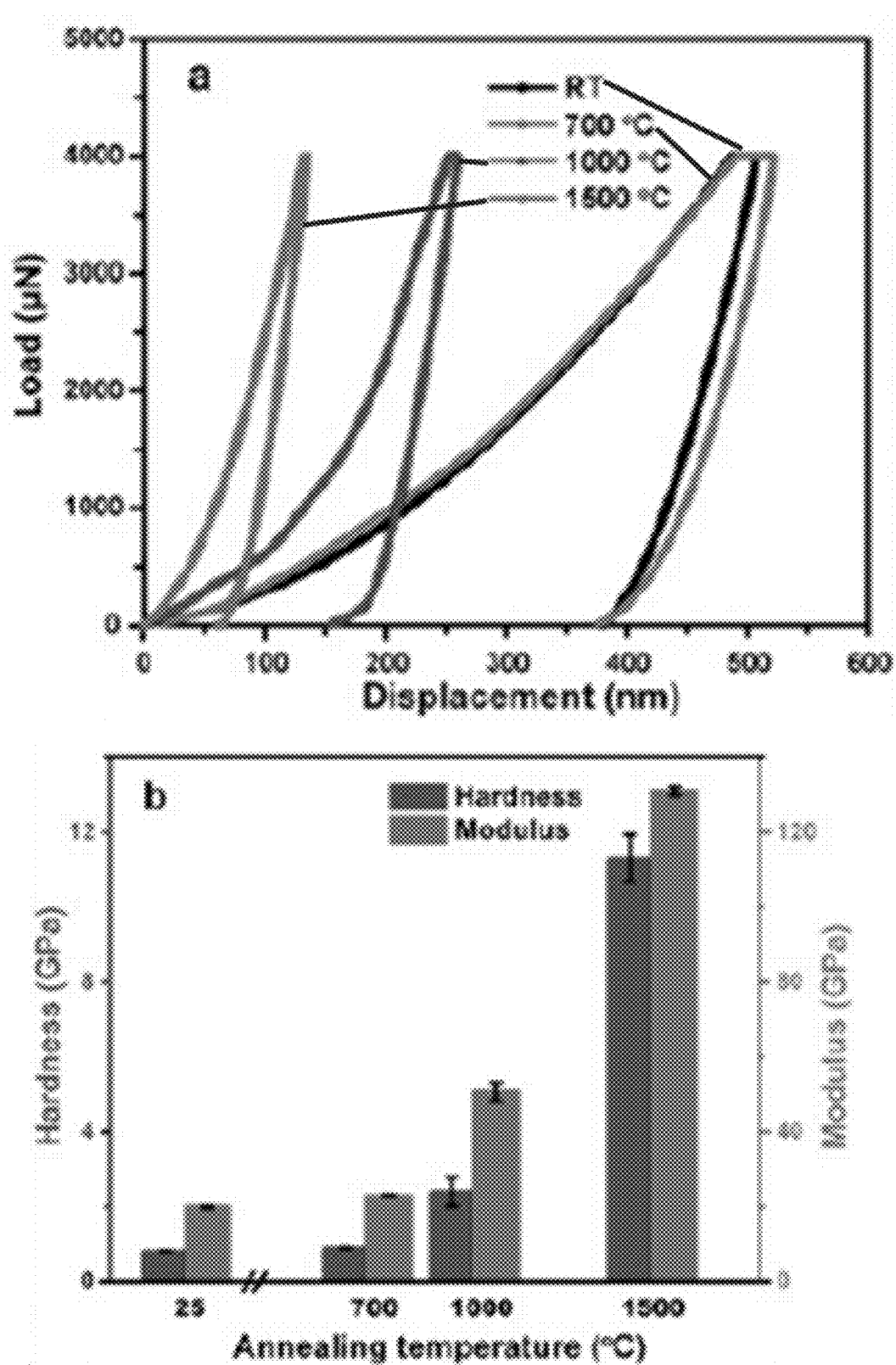
Figure 4:
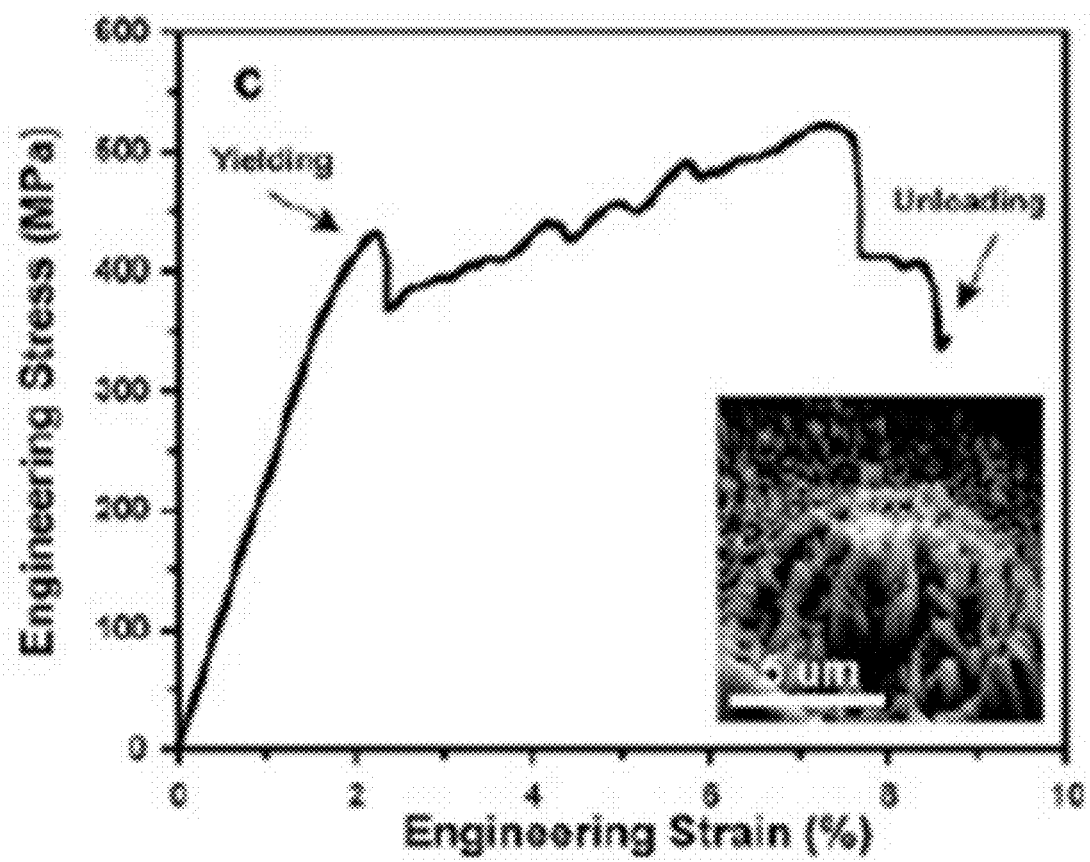
Figure 4:
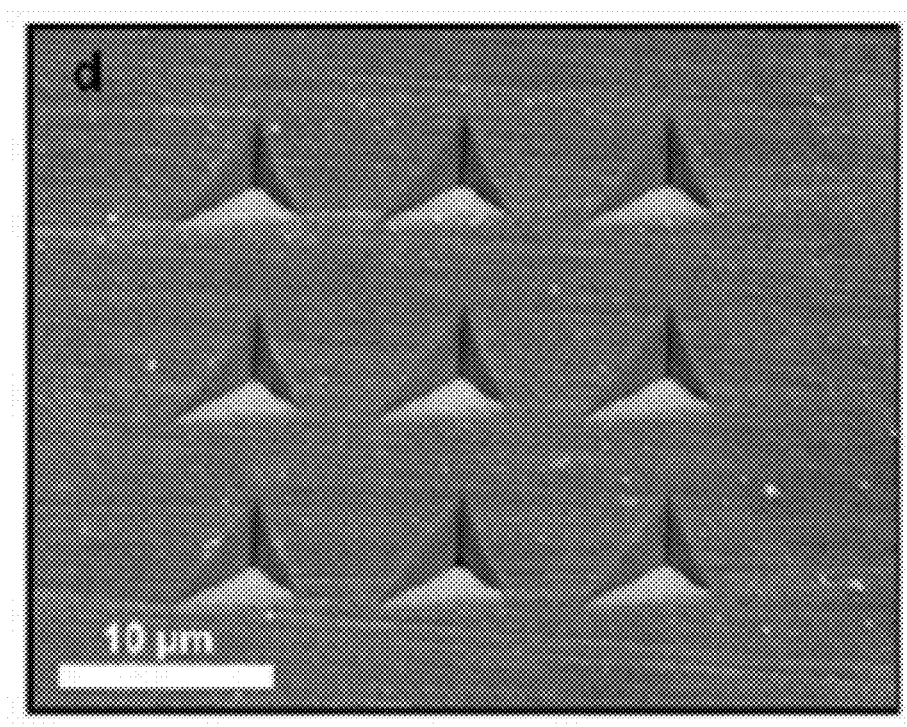
Figure 5:
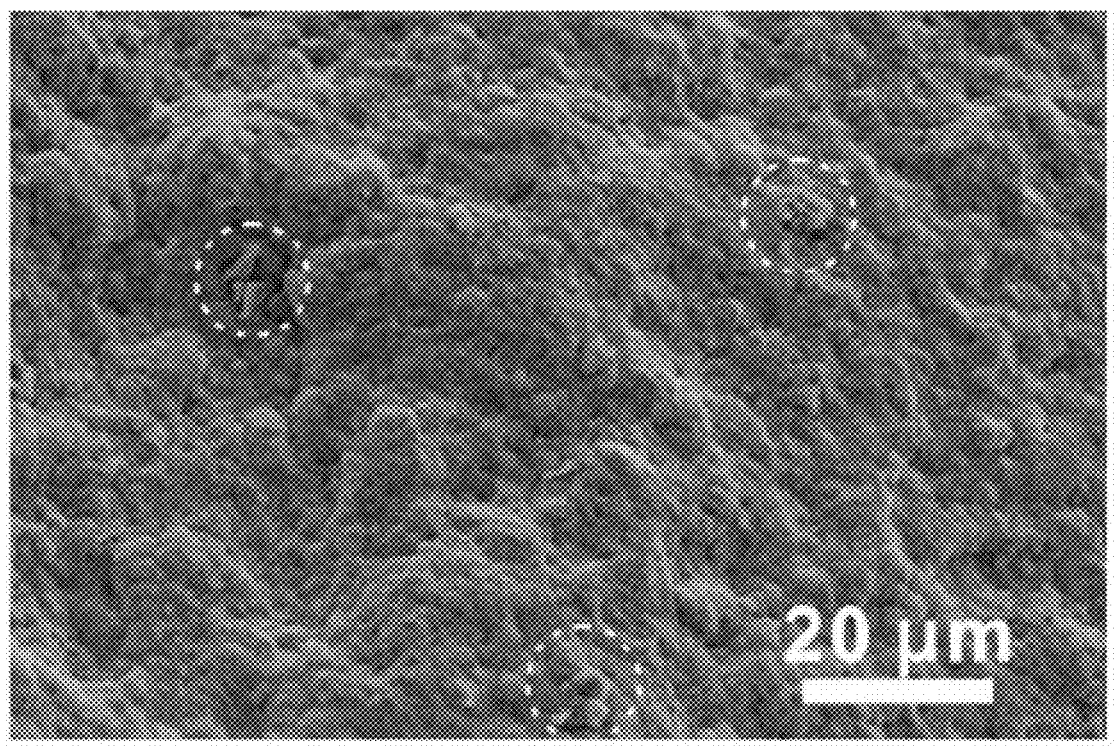
FIG. 5 depicts SEM image of NiFe(OH)x dried at room temperature. The circles label crystalline particles spotted.

The supervariate ceramics fabricated in this work delivered excellent mechanical performance. For example, NiFeCoMn(OH)$_x$ displayed a hardness (H) of 0.8 GPa and a reduced elastic modulus (Er) of 20 GPa upon dried at room temperature (FIGS. 4a-b). Notably, no fractures or defects were observed around the indents after pressed with a large loading force of 500 mN (FIG. 4c), implying the high plasticity of the supervariate ceramics. Furthermore, the as-dried NiFeCoMn(OH)$_x$ remained intact after high-temperature treatments up to 1500° C. with no cracks or flaws observed (FIGS. 1b and 4a-b), while exhibiting further enhanced H/E$_r$ of 0.9/23, 2.4/51, and 11.7/132 GPa after annealed at 700, 1000, and 1500° C., respectively, indicating the advantages of the current fabrication strategy in enabling structural integrity and mechanical robustness with excellent thermal tolerance. The dramatic increment of H/E$_r$ after annealing at 1500° C. can be possibly ascribed to the higher mass density of the ceramics and the abundant phase boundaries between the new precipitates and the amorphous matrix induced by the thermal treatment.

To testify the effect of multi ions on the ceramic, ceramic with fewer types of salt species was synthesized and compared (FIG. 2). It was found that conventional precipitation reaction (e.g., by mixing NiCl$_2$ and NaOH) resulted in the commonly seen crystalline particles upon drying, suggesting the necessity of abundant ion species for forming the monolithic ceramics. With increased salt varieties (NiCl$_2$/FeCl$_3$, NiCl$_2$/FeCl$_3$/CoCl$_2$, and NiCl$_2$/FeCl$_3$/CoCl$_2$/MnCl$_2$), gelatinous and monolithic ceramics were produced, with finer structural features observed when more types of ions were present in the precursor solutions (FIG. 2a). It is worth noting that all these monolith ceramics constructed under the ambient conditions exhibited outstanding mechanical performance (e.g., H/E$_r$ of 1.2/26 GPa for NiFeCo(OH)$_x$).

The monolithic structure forming capabilities and excellent mechanical performance achieved using the methods described herein are remarkable. Both properties can be attributed, at least in part, to the presence of diverse chemical species present in the systems. Notably, to have a continuous structure resistant to segmentation and fracture, the appearance of unpaired dangling bonds should be avoided during material growth, drying, and deformation, so that new free surfaces (which signal fragmentation or breakage) can be effectively eliminated. For the approach reported here, a rich variety of chemical species (ions, atoms, and solvents) are made available in the precursor solution, gels, and solids, to offer ample choices of wide-ranging bonding behaviors and bond-switching flexibilities (as evidenced by the broad XPS features), leading to unusual resistance to structural discontinuity and tolerance to large mechanical deformation with high ductility. Furthermore, this new mechanism of supervariate ceramics should be in principle applicable to wide-ranging material and solvent systems, including both aqueous and non-aqueous solutions, for constructing monolith structures of high quality. In fact, more novel types of monolithic ceramics, e.g., MgZnCaSnAl-oxides, were readily constructed, whereas both ethanol and aqueous solutions of multiple ion species were able to produce supervariate oxide gels and solids (FIG. 1c), demonstrating the versatility of the method described herein. The monolithic ceramic materials prepared according to the methods described herein can possess a smooth and sometimes shiny appearance characteristic of low surface roughness, which is beneficial for alleviating the time-consuming post treatments of polishing and surface finishing. The extraordinary gelatinous state of ceramics directly formed from precursor solutions offer convenience and flexibility in ceramic fabrications and applications. Casting and molding of ceramic gels under mild conditions were finally accomplished, allowing ceramic precision manufacturing at low cost and large scale.

Figure 7:
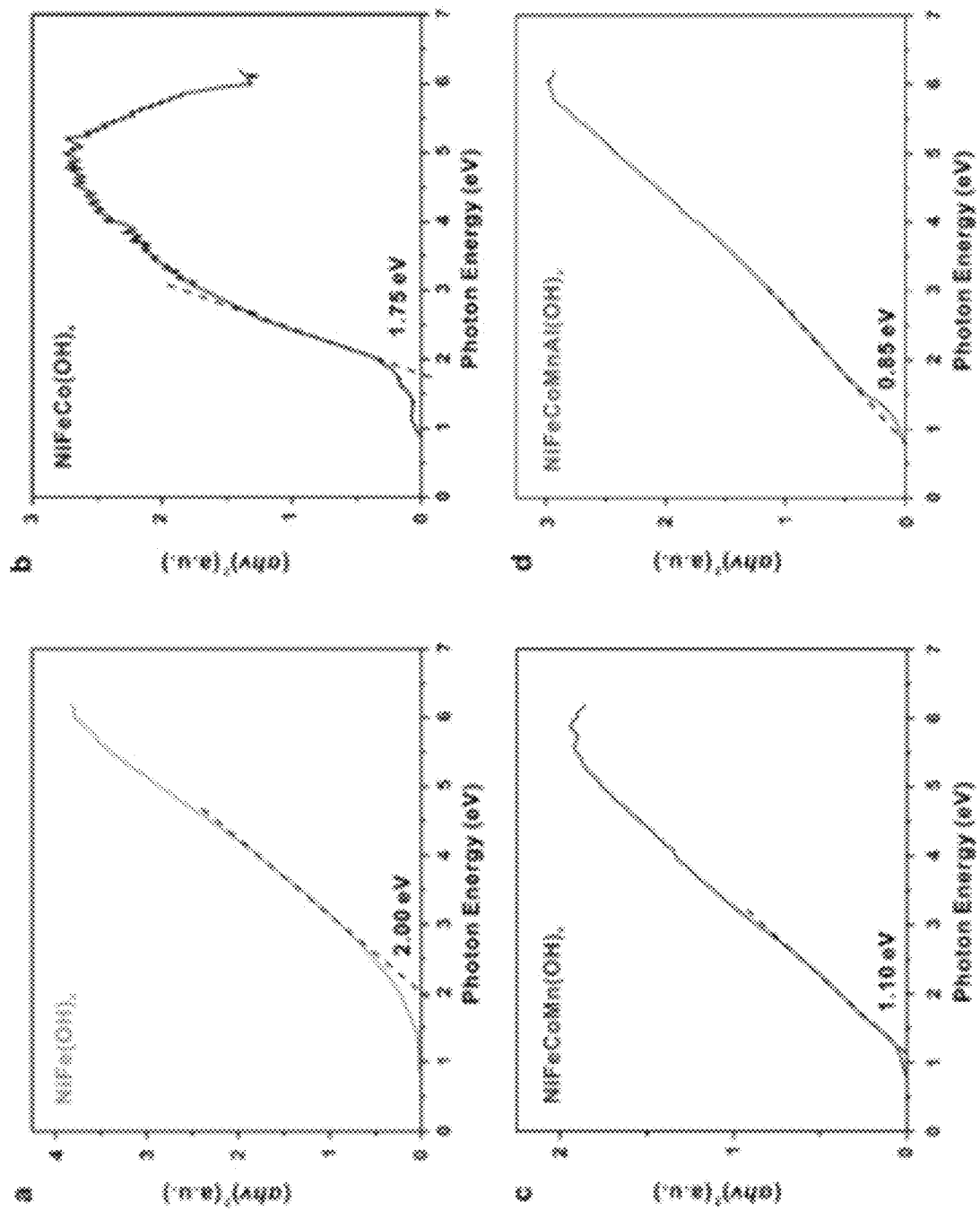
FIG. 7 depicts (a-d) Tauc plotw from UV-Vis analysis of the samples dried at room temperature. The band gap was evaluated by the intercept of the tangent to the plot on the X-axis.
Figure 8:
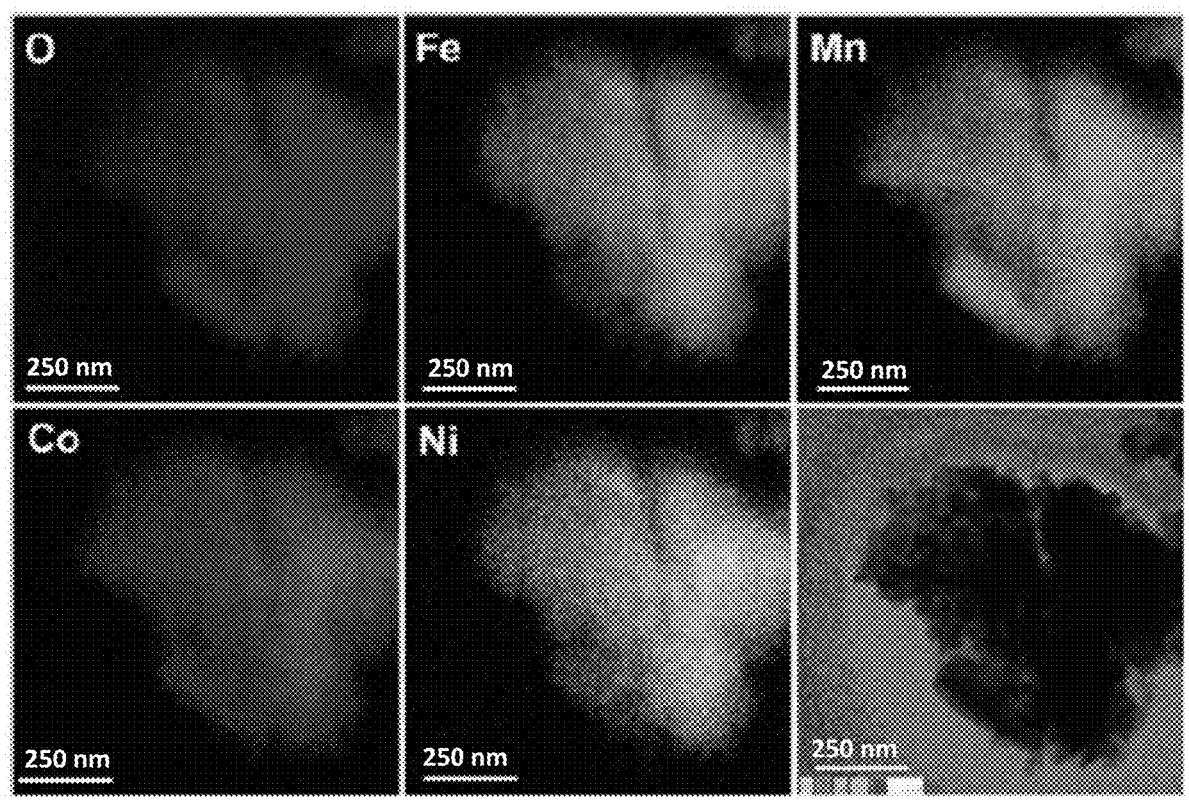
FIG. 8 depicts EDX elemental mapping images of $NiFeCoMn(OH)_x$ annealed at 700° C.
Figure 9:
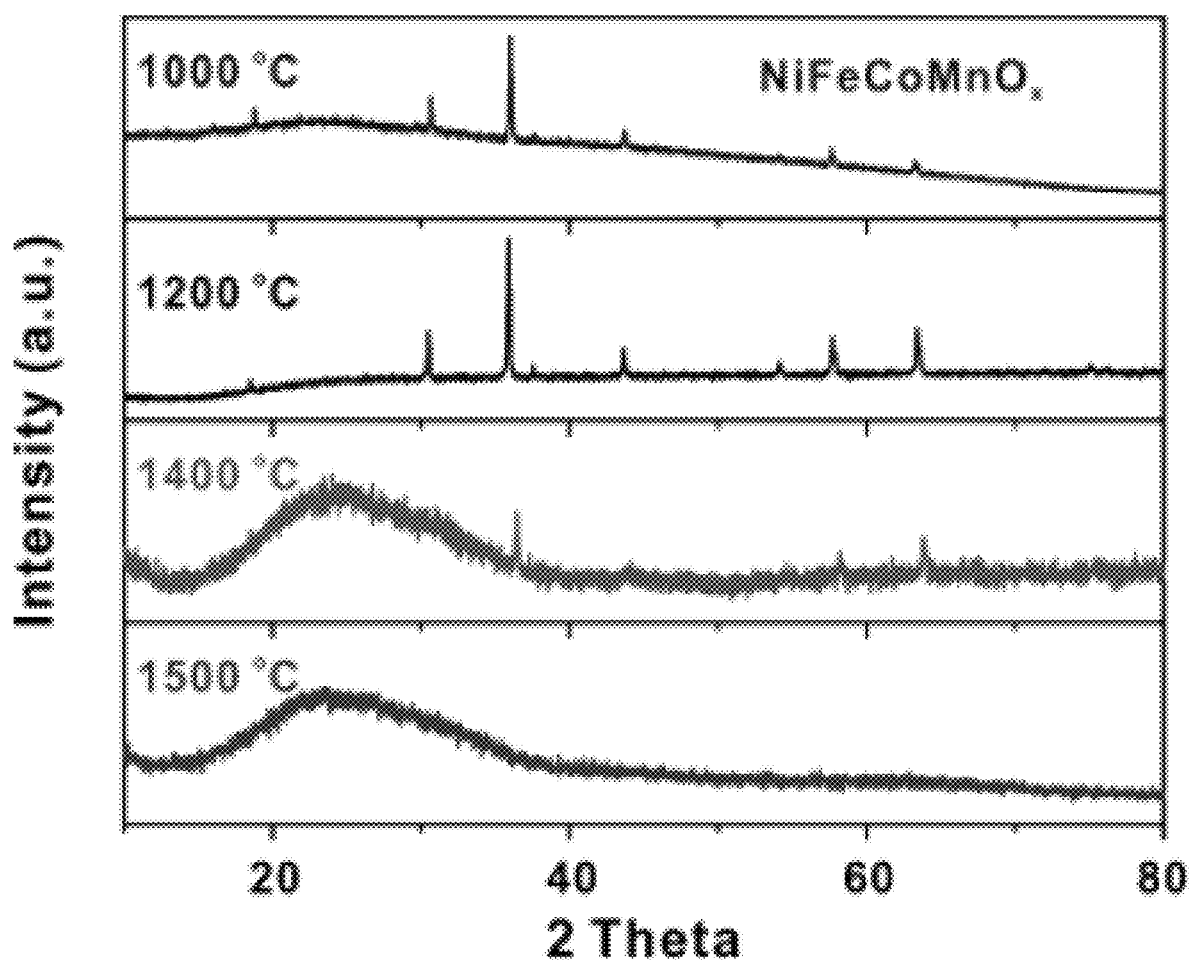
FIG. 9 depicts XRD patterns of NiFeCoMnOx annealed at 1000, 1200, 1400 and 1500° C.

Besides the fabrication convenience, the methods described herein can be used to enable various properties and functionalities. For example, semiconducting ceramics of gradually narrowed electronic bandgaps were easily achieved by adding more ion species in the precursor solutions (FIG. 7). Bandgap engineering is one of most important parameters for semiconductor, because of its critical role in determining materials performance for a broad scope of applications, such as, solar cells, photocatalysts, lasers, detectors, light-emitting devices, and displays. Conventional approaches adjusting the bandgap mainly rely on doping or defect-induction which generally involve complex operations and can only adjust the bandgap over a small range. Recent research has shown that dramatic changes of the lattice constants can result in broadly tunable bandgap energies, but this approach is largely limited to nanomaterials, e.g., nanowires or 2D materials, for bulk materials are much more intolerant to large lattice mismatches. Interestingly, the methods described herein produce bulk materials with widely variable bandgaps, e.g., from 1.60 eV that gradually narrowed to 0.40 eV, by simply increasing the different types of ion species in the precursor solutions, which further illustrates the versatility of the methods described herein.

In summary, a new mechanism is utilized for constructing gelatinous and monolithic ceramics from a multiple-ionic precursor solution at amiable conditions, enabling excellent mechanical performance. The facile and versatile casting and molding techniques conventionally only applicable to metals and polymers are now open to ceramic materials, only entailing simple operations at moderate conditions. The approach reported in this work will afford easy access to various ceramic devices for wide applications, such as, direct ceramic printing, room-temperature glazing, and ceramic precision manufacturing at large scale and low cost.

Experimental Methods

Synthesis

The ceramic materials were synthesized by a co-precipitation method with the corresponding transition metal chlorides and sodium hydroxide as precursors. Taking NiFeCoMn(OH)$_x$ as an example, 1 mmol each of CoCl$_2$·6H$_2$O, FeCl$_3$, NiCl$_2$·6H$_2$O, and MnCl$_2$ were first dissolved in 120 ml of ethanol with the resultant solution marked as "Solution A". "Solution B" was prepared by dissolving 16 mmol of NaOH in 40 ml of ethanol. Solution B was slowly added into Solution A under continuous stirring, producing a dark brown ceramic gel precipitate, which was centrifuged and washed several times with water and ethanol, and then left to dry in the air thereby forming the ceramic material. Other types of ceramics materials were synthesized from their corresponding transition metal salts using a similar method.

3D Printing

The ink was the centrifuge-washed FeCoNiMn(OH)$_x$ slurry with the polyurethane-based associative thickener agent (1.0 wt %) sold under the tradename TEGO® Viscoplus (Shunde Sansheng Trade Co. LTD), mixed in a Thinky mixer (AER 310) at 1800 rpm for 4 min. The ink was transferred into a syringe and degassed via centrifugation. 3D printing was carried out in a DIW 3D printer (Regenovo 3D bio-printer, China) with the nozzle diameter, printing speed, and printing pressure set as 0.41 mm, 0.14-0.8 MPa, and 8 mm·s$^{-1}$, respectively. The printing patterns were designed using the software Solideworks. The products were printed on a silicon wafer and dried under ambient conditions thereby forming a printed ceramic substrate.

Characterization

X-ray diffraction (XRD) patterns were collected on a diffractometer (Rigaku SmartLab) using Cu Kα radiation. The morphology and microstructures of the obtained samples were investigated using a field-emission scanning electron microscope (Philips XL-30 FESEM), a transmission electron microscope (TEM, Tecnai F20) equipped with an energy-dispersive X-ray (EDX) spectroscope (Oxford INCA). Raman spectroscopy was carried out with a Renishaw 2000 Raman microscope with a 633 nm wavelength laser for excitation, calibrated using the Si peak at 520 cm$^{-1}$ as the reference. Simultaneous thermogravimetry (TG) and differential scanning calorimetry (DSC) measurements were performed on a TG-DTA thermal analyzer (METTLER TOLEDO) in flowing Ar at a heating rate of 5° C. min$^{-1}$ with an isothermal step at 400° C. for 30 min. The optical absorption spectra were measured on a UV-VIS-NIR spectrophotometer (solidspec-3700, SHIMADZU) with the wavelength range between 200 nm and 1500 nm.

The material band gap was estimated by using the solid absorption coefficient for direct bandgap semiconductor according to:

$$(ahn)^{1/n}=A^*(hv-E_g)$$

where h is the Planck's constant, n is the photon's frequency, a is the absorption coefficient, $E_g$ is the band gap, and $A^*$ is the slope of the Tauc plot in the linear region. For the direct band gap, the value of n is ½, thus the band gap energies were calculated by plotting Tauc's graphs between $(\alpha hv)^2$ versus photon energy (hv). The intercept of the tangent to the plot on the X-axis gives the direct band gap of the samples.

The indentation tests were performed on a Hysitron's TI750 nanoindenter with a Berkovich tip using Oliver-Pharr method. The sample surfaces were diamond-polished to mirror quality before tests. Typically 9 indentations were made for each measurement. The indenter was calibrated by measuring the Young's modulus and hardness of an aluminum stand. Micro-pillar samples were fabricated by FIB, with 30 kV/1.5 pA as the final milling conditions. The aspect ratio (height/diameter) of the pillar was 2-3, and the taper angle less than 1.5°. SEM in situ compression tests were conducted at room temperature using a PI 85 PicoIndenter (Hysitron Inc.) with a diamond punch inside a FEI Quanta 450 FEG scanning electron microscope, under the displacement-control mode and at a strain rate of 0.001-0.005 s$^{-1}$.

What is claimed is:

1. A method of preparing a ceramic material, the method comprising: providing a ceramic gel comprising a plurality of metal hydroxides and a solvent; and subjecting the ceramic gel to a drying process thereby removing at least a portion of the solvent and forming the ceramic material, wherein the ceramic gel is formed by combining a precursor solution comprising a plurality of metal salts and an inorganic base selected from the group consisting of an alkali metal hydroxide and an alkaline earth metal hydroxide, wherein the concentration of each of the plurality of metal salts in the precursor solution is 0.1-10 mmol/L.

2. The method of claim 1, wherein the ceramic gel comprises three or more metal hydroxides.

3. The method of claim 1, wherein each of the plurality of metal hydroxides comprise a metal selected from Group 2, 4, 6, 7, 9, 10, 13, or 14 of the periodic table of elements.

4. The method of claim 1, wherein each of the plurality of metal hydroxides comprise a metal selected from the group consisting of iron, cobalt, nickel, manganese, aluminum, molybdenum, tungsten, zinc, magnesium, calcium, titanium, and tin.

5. The method of claim 4, wherein the ceramic gel comprises three or more metal hydroxides.

6. The method of claim 1, wherein the solvent comprises water, an alcohol, dimethylformamide, dimethyl sulfoxide, or a mixture thereof.

7. The method of claim 1, wherein each of the plurality of metal salts comprise one or more anions selected from the group consisting of nitrate, phosphate, sulfate, acetate, oxalate, hydrogenphosphate, carbonate, bicarbonate, and halide.

8. The method of claim 1, wherein the inorganic base is LiOH, NaOH, or KOH.

9. The method of claim 1, wherein the drying process comprises drying at 20-100° C.

10. The method of claim 9, wherein the ceramic material has a hardness of 0.8-1 GPa and an elastic modulus of 20-23 GPa.

11. The method of claim 1, wherein the ceramic gel further comprises a thickening agent; and the method further comprises the steps of casting or molding the ceramic gel thereby forming a molded ceramic gel; subjecting the molded ceramic gel to the drying process thereby forming a molded ceramic gel material; and annealing the molded ceramic gel material.

12. The method of claim 11, wherein the thickening agent is selected from the group consisting of a polyurethane thickener, a polyacrylate thickener, a hydrophobically-modified polyacrylate thickener, a hydrophobically-modified polyether thickener, a cellulose ether thickener, a hydrophobically-modified cellulose ether thickener.

13. The method of claim 1, wherein the method comprises: providing the ceramic gel comprising at least four metal hydroxides comprising a metal selected from the group consisting of iron, cobalt, nickel, manganese, aluminum, molybdenum, tungsten, zinc, magnesium, calcium, titanium, and tin; and the solvent selected from the group consisting of water, methanol, ethanol, and mixtures thereof; and subjecting the ceramic gel to drying at a temperature of 20-40° C. thereby removing at least a portion of the solvent and forming the ceramic material; and optionally annealing the ceramic material at a temperature of 1,300-1,700° C.

14. The method of claim 13, wherein the ceramic gel comprises nickel, iron, manganese, and aluminum or nickel, iron, cobalt, and manganese.

15. A method of preparing a ceramic material, the method comprising: providing a ceramic gel comprising a plurality of metal hydroxides and a solvent; subjecting the ceramic gel to a drying process thereby removing at least a portion of the solvent and forming the ceramic material; and annealing the ceramic material at 500-2,000° C. thereby forming an annealed ceramic material, wherein the annealed ceramic material is substantially amorphous.

16. The method of claim 15, wherein the annealed ceramic material has a hardness of 2.4-11.7 GPa and an elastic modulus of 51-132 GPa.

\* \* \* \* \*